US011480553B2

(12) United States Patent
Watanabe

(10) Patent No.: US 11,480,553 B2
(45) Date of Patent: Oct. 25, 2022

(54) LIQUID CHROMATOGRAPHY DETECTOR

(71) Applicant: Shimadzu Corporation, Kyoto (JP)

(72) Inventor: Masato Watanabe, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 370 days.

(21) Appl. No.: 16/469,744

(22) PCT Filed: Nov. 13, 2017

(86) PCT No.: PCT/JP2017/040749
§ 371 (c)(1),
(2) Date: Jun. 14, 2019

(87) PCT Pub. No.: WO2018/131279
PCT Pub. Date: Jul. 19, 2018

(65) Prior Publication Data
US 2020/0088699 A1 Mar. 19, 2020

(30) Foreign Application Priority Data

Jan. 16, 2017 (JP) .............................. JP2017-004892

(51) Int. Cl.
G01N 30/74 (2006.01)
G01N 21/05 (2006.01)
G01N 30/02 (2006.01)

(52) U.S. Cl.
CPC .............. *G01N 30/74* (2013.01); *G01N 21/05* (2013.01); *G01N 2030/027* (2013.01)

(58) Field of Classification Search
CPC .. G01N 30/74; G01N 2030/027; G01N 21/03; G01N 21/0303; G01N 21/0307; G01N 21/0389; G01N 21/05; G01N 21/15
See application file for complete search history.

(56) References Cited

U.S. PATENT DOCUMENTS 3,240,340 A * 3/1966 Hayes .................... G01N 30/90
210/198.3
5,120,129 A * 6/1992 Farquharson .......... G01N 21/05
250/576
(Continued)

FOREIGN PATENT DOCUMENTS

| CN | 104204739 A | 12/2014 |
| JP | H11-173978 A | 7/1999 |
| JP | 2016-099311 A | 5/2016 |

(Continued)

OTHER PUBLICATIONS

Written Opinion by the International Search Authority for PCT application PCT/JP2017/040749, submitted with a machine translation.

(Continued)

*Primary Examiner* — Justin N Olamit
(74) *Attorney, Agent, or Firm* — Muir Patent Law, PLLC

(57) ABSTRACT

A detector includes a light source configured to emit measurement light, a flow cell incorporating a cell channel through which a sample solution flows inside, a photodetector configured to detect light from the flow cell, an optical system configured to guide light from the light source to the flow cell and guide light from the flow cell to the photodetector, and a flow cell accommodating part configured to cover the flow cell so as to spatially separate the flow cell from the optical system. Of the side surfaces of the flow cell accommodating part, the side surfaces facing the light incident surface and the light exit surface of the flow cell are formed from wall surfaces made of a light transmissive material, or sealed by a light transmissive plate material.

8 Claims, 2 Drawing Sheets

(56) References Cited

U.S. PATENT DOCUMENTS

| | | | | |
|---|---|---|---|---|
| 5,223,716 | A * | 6/1993 | Rossiter | G01N 21/09 |
| | | | | 250/343 |
| 5,408,313 | A * | 4/1995 | Ponstingl | G01N 21/8507 |
| | | | | 356/246 |
| 5,537,336 | A * | 7/1996 | Joyce | G01N 33/2858 |
| | | | | 250/301 |
| 6,122,049 | A * | 9/2000 | Sugiyama | G01N 30/74 |
| | | | | 356/246 |
| 7,369,226 | B1 | 5/2008 | Hewitt | |
| 8,268,248 | B2 * | 9/2012 | Steuerwald | G01N 21/253 |
| | | | | 422/82.05 |
| 9,719,917 | B2 * | 8/2017 | Frojdh | G01N 21/33 |
| 2012/0009694 | A1 | 1/2012 | Maslar et al. | |
| 2012/0119101 | A1 * | 5/2012 | Wynn | G01N 21/05 |
| | | | | 250/373 |
| 2015/0109610 | A1 | 4/2015 | Gunji | |

FOREIGN PATENT DOCUMENTS

| | | |
|---|---|---|
| WO | 2013/140617 A1 | 9/2013 |
| WO | 2013140617 A1 | 9/2013 |

OTHER PUBLICATIONS

First Examination Report dated Sep. 29, 2020 for the Indian Patent Application No. 201947028169 from the Indian Patent Office.
First Office Action from the Chinese Intellectual Property Office for corresponding application CN 2017800699060, dated Mar. 1, 2021, submitted with a machine translation.
Notice of Reasons for Refusal for Japanese Patent Application No. JP 2018-561826, dated Sep. 30, 2019.
Office Action issued by the Chinese Patent Office for the corresponding Chinese Patent Application No. 201780069906.0, dated Jan. 11, 2022.

* cited by examiner

Mobile Phase

LIQUID CHROMATOGRAPHY DETECTOR

TECHNICAL FIELD

The present invention relates to a liquid chromatography detector, and more particularly, to a liquid chromatography detector including a flow cell that circulates an eluate from an analytical column.

BACKGROUND ART

Many liquid chromatography detectors use light. A cell channel is placed on the optical path of light, and a sample flows through the cell channel, thereby detecting the reaction (absorbance or refractive index) between the sample and light (see Patent Document 1). An absorptiometer detector is known as a typical liquid chromatography detector. The absorptiometer detector includes a flow cell incorporating a flow channel (cell channel) through which the sample solution eluted from the separation column flows. The flow cell is then irradiated with light in a predetermined wavelength range from the light source, and the intensity of the light transmitted through the flow cell is measured by the photodetector to obtain the absorbance in the predetermined wavelength range, thereby quantitatively determining the sample component concentration of a sample solution flowing in the cell channel.

In such a detector, in addition to the flow cell, an optical system for causing light from the light source to enter the flow cell and guiding the light exiting from the flow cell to the detector is accommodated in a common housing. The inside of the housing is formed into a substantially closed system to minimize the intrusion of light other than measurement light from outside into the housing and the influence of the atmosphere outside the detector on the optical system.

PRIOR ART DOCUMENT

Patent Document

Patent Document 1: Japanese Patent Laid-open Publication No. 11-173978

SUMMARY OF THE INVENTION

Problems to be Solved by the Invention

A mobile phase always flows in the flow cell during analysis. The mobile phase contains an organic solvent. If a liquid leak occurs in the flow cell, the organic solvent evaporates and fills the housing. This causes deterioration or corrosion of lenses, mirrors, diffraction gratings, and the like constituting the optical system.

As a method of suppressing the influence of the liquid leaking from the flow cell on the optical system, it is effective to provide a discharge port below the flow cell for discharging the liquid leaking from the flow cell to the outside of the housing. It has been found that, if the discharge port is provided, outside air enters from the discharge port and may cause deterioration or corrosion of the optical system and the like. However, if the discharge port is not provided, there is no place for leaked liquid to escape when a liquid leak occurs in the flow cell. In the worst case, the flow cell or an optical element in the spectroscope may be submerged.

Therefore, an object of the present invention is to provide a detector having a structure in which the optical system is robust against the influences of liquid leaking from the flow cell or the outside air even when a discharge port for discharging liquid leaking from the flow cell is provided.

Solutions to the Problems

A detector according to the present invention includes a light source configured to emit measurement light, a flow cell incorporating a cell channel through which a sample solution flows inside, a photodetector for detecting light from the flow cell, an optical system configured to guide light from the light source to the flow cell and guide light from the flow cell to the photodetector, and a flow cell accommodating part configured to cover the flow cell so as to spatially separate the flow cell from the optical system. Of the side surfaces of the flow cell accommodating part, the side surfaces facing the light incident surface and the light exit surface of the flow cell are formed from wall surfaces made of a light transmissive material, or sealed by a light transmissive plate material.

In this case, "wall surfaces made of a light transmissive material" and the "light transmissive plate material" are each made of a material that has no absorption characteristics for the measurement wavelength and have resistance against an organic solvent or the like used as a mobile phase in the liquid chromatograph.

In a preferred embodiment, the wall surface of the flow cell accommodating part surrounding the periphery of the flow cell is made of a material that transmits no light, the wall surfaces facing the light incident surface and the light exit surface of the flow cell are provided with openings for passing light entering the flow cell and light exiting from the flow cell, and the openings are sealed by the light transmissive plate.

In the above case, an elastic sealing member is preferably sandwiched between the wall surface of the flow cell accommodating part and the light transmissive plate material so as to fill the gap between the flow cell accommodating part and the light transmissive plate. This can more reliably suppress the leakage of the gas in the flow cell accommodating part toward the space in which the optical system is stored and more reliably prevent deterioration and corrosion of the optical system.

A glass material such as a quartz plate can be used as the light transmissive plate material.

Effects of the Invention

The detector according to the present invention includes the flow cell accommodating part covering the flow cell so as to spatially separate the flow cell from the optical system, and side surfaces of the side surfaces of the flow cell accommodating part which face the light incident surface and the light exit surface of the flow cell are each formed by the wall surface made of a light transmissive material or is sealed by a light transmissive plate material. This makes it possible to spatially separate the space storing the flow cell from the space storing the optical system without inhibiting light from entering the flow cell and exiting from the flow cell. Accordingly, even when a liquid leak occurs in the flow cell, it is possible to suppress the influence of the vaporized liquid on the optical system. In addition, even when a discharge port for the liquid leaking from the flow cell is provided below the flow cell, it is possible to suppress the influence of outside air entering from the discharge port on the optical system. As a result, the frequency of replacement of optical elements constituting the optical system is reduced, and hence the cost of parts can be reduced.

EMBODIMENT OF THE INVENTION

An embodiment of a detector will be described below with reference to the accompanying drawings.

The configuration of the detector according to the embodiment will be described with reference to FIGS. 1, 2, and 3.

Figure 1:
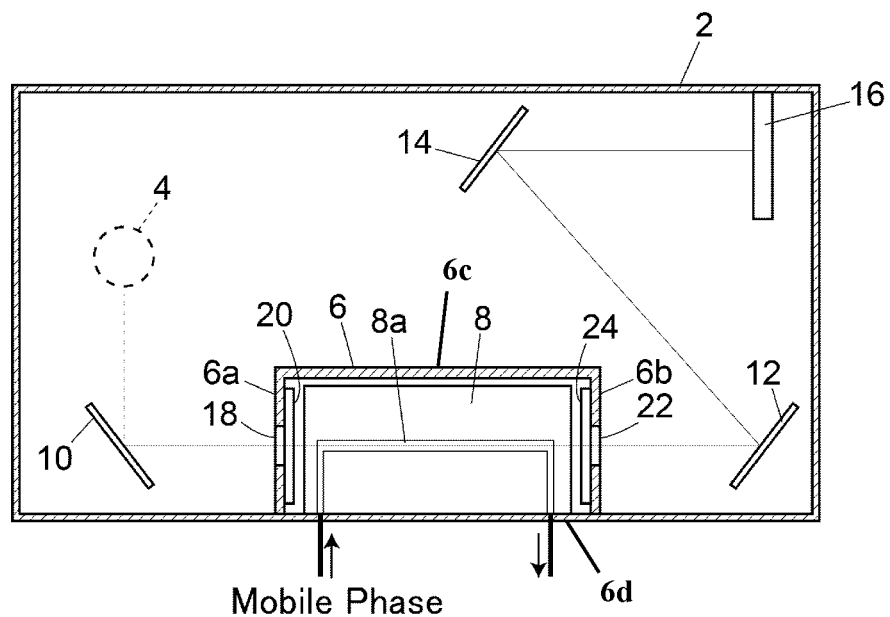
FIG. 1 is a schematic view showing the internal arrangement of a spectroscope according to an embodiment.

FIG. 1 shows the inside of the spectroscope. A flow cell accommodating part 6 is provided inside a spectroscope 2, and a flow cell 8 is stored in the flow cell accommodating part 6. Furthermore, the spectroscope 2 incorporates mirrors 10 and 12, a diffraction grating 14, and a photodetector 16. A light source 4 for emitting measurement light is provided outside the spectroscope 2, and the housing of the spectroscope 2 is provided with an entrance slit (not shown) for taking in light from the light source 4.

The internal space of the spectroscope 2 is substantially sealed by the housing so that light other than light from the light source 4 does not enter. Inside the spectroscope 2, the measurement light introduced into the spectroscope 2 through the entrance slit is reflected by the mirror 10 and guided to the flow cell 8, and the light transmitted through the flow cell 8 is reflected by the mirror 12 and introduced to the diffraction grating 14. Light having a measurement wavelength is then guided to the photodetector 16 by the diffraction grating 14. That is, the mirrors 10 and 12 and the diffraction grating 14 constitute an optical system for causing light from the light source 4 to enter the flow cell 8 and guiding light exiting from the flow cell 8 to the detector 16.

The flow cell accommodating part 6 has wall surfaces (e.g., 6a, 6b, 6c, and 6d) covering the periphery of the flow cell 8 so as to form a space separated from the space storing the optical system including the mirrors 10 and 12 and the diffraction grating 14 and the photodetector 16. The wall surfaces defining the flow cell accommodating part 6 are made of the same material (for example, an aluminum material) as the wall surfaces of the housing of the spectroscope 2.

A cell channel 8a through which the mobile phase of the liquid chromatograph flows is provided inside the flow cell 8, and an inlet and an outlet communicating with both ends of the cell channel 8a are provided in the outer surface of the flow cell 8. Piping is connected to the inlet and the outlet of the outer surface of the flow cell 8 through holes (not shown) provided in the housing of the spectroscope 2. This makes the eluate from the separation column of the liquid chromatograph flow in the cell channel 8a.

An opening 18 for guiding the light reflected by the mirror 10 into the flow cell accommodating part 6 is provided in the wall surface 6a of the wall surfaces of the flow cell accommodating part 6 which faces the light incident surface (left surface in FIG. 1) of the flow cell 8. An opening 22 for making light transmitted through the flow cell 8 exit toward the mirror 12 is provided in the wall surface 6b of the wall surfaces of the flow cell accommodating part 6 which faces the light exit surface (right surface in FIG. 1) of the flow cell 8.

Light transmissive plate materials 20 and 24 are provided on the inner sides of the wall surfaces 6a and 6b of the flow cell accommodating part 6, respectively. The light transmissive plate materials 20 and 24 are plate-like members made of a material having no absorption characteristics at the measurement wavelength for the sample and having chemical resistance against an organic solvent or the like used as the mobile phase of the liquid chromatograph. Although a quartz plate is typical of light transmissive plate materials 20 and 24, it is possible to use a plate-like member made of another materials as long as it has the above characteristics.

The light transmissive plate materials 20 and 24 respectively seal the openings 18 and 22 to form the flow cell accommodating part 6 into a substantially closed system. An example of a structure for sealing the openings 18 and 22 will be described with reference to FIGS. 2 and 3. In this case, only the structure on the wall surface 6a side will be described, but the same structure is also formed on the wall surface 6b side.

Figure 2:
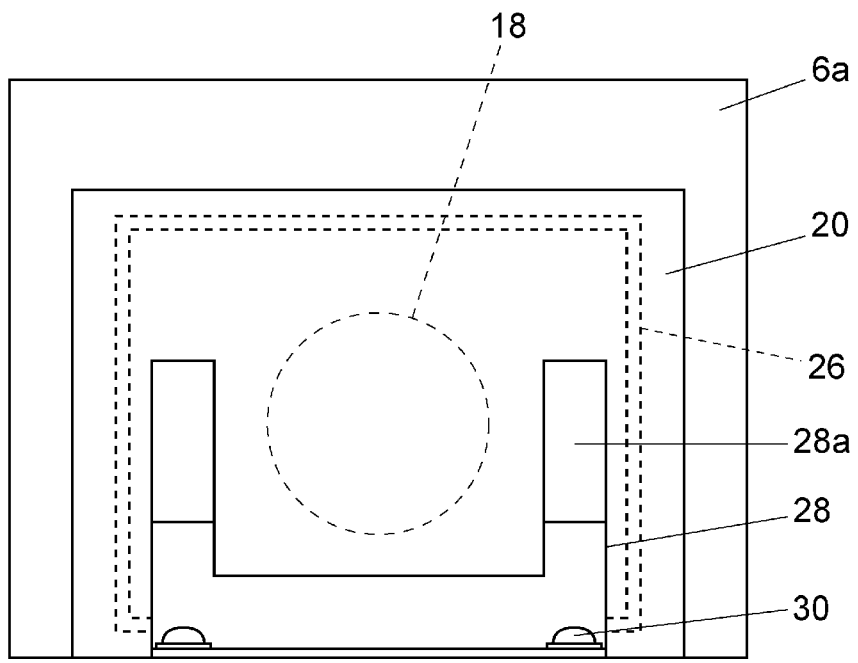
FIG. 2 is a view showing the incident side wall surface of a flow cell accommodating part according to the embodiment when viewed from the inside.
Figure 3:
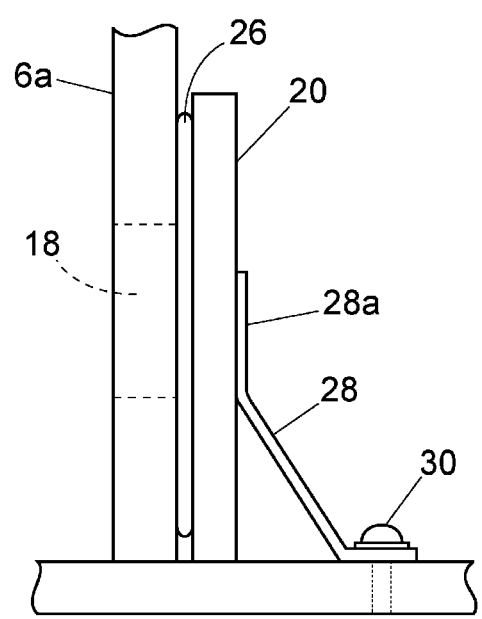
FIG. 3 is a side view of the incident side wall surface of the flow cell accommodating part according to the embodiment.

As shown in FIGS. 2 and 3, the light transmissive plate material 20 is a rectangular plate-like member larger than the opening 18. A frame-like elastic sealing member 26 surrounding the periphery of the opening 18 is sandwiched between the wall surface 6a and the light transmissive plate 20. The elastic sealing member 26 is made of, for example, a closed-pore foam material (sponge).

A leaf spring 28 is provided inward from the light transmissive plate material 20 (the right side in FIGS. 1 and 3). The lower end of the leaf spring 28 is fixed to the bottom surface of the housing of the spectroscope 2 with screws. The upper end portion of the leaf spring 28 presses the light transmissive plate material 20 against the wall surface 6a with elastic force. The elastic sealing member 26 is deformed by causing the leaf spring 28 to press the light transmissive plate material 20 toward the wall surface 6a with elastic force, thereby sealing the gap between the wall surface 6a and the light transmissive plate material 20.

In this embodiment, the leaf spring 28 is used as an elastic member for pressing the light transmissive plate material 20 toward the wall surface 6a. However, any configuration may be used as long as it is structured to press the light transmissive plate material 20 toward the wall 6a.

Further, in this embodiment, the openings 18 and 22 are sealed by the light transmissive plate materials 20 and 24, and the inside of the flow cell accommodating part 6 is formed into a substantially sealed space. For example, the wall surfaces 6a and 6b themselves may be formed from a light transmissive material such as quartz. In this case, the wall surfaces 6a and 6b themselves are light transmissive, and hence, the openings 18 and 22 become unnecessary. This makes it unnecessary to provide the light transmissive plate materials 20 and 24 for sealing them.

Although not shown in FIGS. 1 to 3, a discharge port for discharging the liquid leaking from the flow cell 8 to the outside of the spectroscope 2 is provided in the bottom surface of the spectroscope 2 at a position below the flow cell 8. Accordingly, outside air enters the flow cell accommodating part 6 through the discharge port, but the space in the flow cell accommodating part 6 is separated from other spaces in the spectroscope 2 by the structure of the embodiment described above. This inhibits the gas in the flow cell accommodating part 6 from flowing out to the space side where the mirrors 10 and 12, the diffraction grating 14, and the photodetector 16 are provided. Therefore, even when a liquid leak occurs in the flow cell or outside air intrudes from the discharge port, the influence of the leak on the optical system and the photodetector 16 can be suppressed.

DESCRIPTION OF REFERENCE SIGNS

2: Spectroscope
4: Light source
6: Flow cell accommodating part
6a, 6b: Wall surface
8: Flow cell
8a: Cell channel
10, 12: Mirror
14: Diffraction grating
16: Photodetector
18, 22: Opening
20, 24: Light transmissive plate material
26: Elastic sealing member
28: Leaf spring
30: Screw

The invention claimed is:

1. A chromatography detector comprising:
a light source configured to emit measurement light;
a flow cell incorporating a cell channel through which a sample solution flows inside and having a light incident surface on which the measurement light is incident and a light exit surface from which the measurement light is emitted, the light exit surface being opposite to the light incident surface, wherein the flow cell has an outer surface on which an inlet and an outlet are provided;
a photodetector for detecting light from the flow cell;
an optical system configured to guide light from the light source to the flow cell and guide light from the flow cell to the photodetector; and
a housing accommodating the optical system and the flow cell, wherein the housing includes a flow cell accommodating part including a plurality of wall surfaces configured to cover the flow cell so as to spatially separate the flow cell from the optical system, wherein the plurality of wall surfaces include a first side surface, a second side surface and a plurality of lateral surfaces, and wherein the first side surface and the second surface face the light incident surface and the light exit surface respectively,
wherein the first side surface and the second side surface are formed from a light transmissive material, or sealed by a light transmissive plate material,
wherein the housing has a wall surface which faces the outer surface of the flow cell and forms one of the plurality of wall surfaces of the flow cell accommodating part, the wall surface of the housing has through holes for introducing channels from outside of the housing to inside of the flow cell accommodating part, and
wherein the inlet and the outlet of the flow cell are connected with the channels introduced into the flow cell accommodating part through the through holes.

2. The chromatography detector according to claim 1, wherein the plurality of lateral surfaces of the flow cell accommodating part surrounding the periphery of the flow cell is made of a material that transmits no light, the first side surface and the second side surface are provided with openings for passing light entering the flow cell and light exiting from the flow cell, and the openings are sealed by the light transmissive plate material.

3. The chromatography detector according to claim 2, wherein an elastic sealing member is sandwiched between the first side surface and the light transmissive plate material so as to fill a gap between the flow cell accommodating part and the light transmissive plate material.

4. The chromatography detector according to claim 1, wherein the light transmissive plate material is a quartz plate.

5. The chromatography detector according to claim 1, wherein the flow cell, the optical system, and the flow cell accommodating part are stored in a housing of a spectroscope of the chromatography detector.

6. The chromatography detector according to claim 5, wherein the flow cell accommodating part includes a wall surface covering a periphery of the flow cell placed in the housing of the spectroscope.

7. The chromatography detector according to claim 6, wherein the plurality of lateral surfaces of the flow cell accommodating part are formed from the same material as the housing of the spectroscope.

8. The chromatography detector according to claim 5, wherein a discharge port configured to discharge a liquid leaking from the flow cell to outside of the spectroscope is provided in a bottom surface of the spectroscope at a position below the flow cell.

\* \* \* \* \*